(12) United States Patent
Nishikawa et al.

(10) Patent No.: US 11,168,923 B2
(45) Date of Patent: Nov. 9, 2021

(54) WATER HEATER

(71) Applicant: NORITZ CORPORATION, Hyogo (JP)

(72) Inventors: Midori Nishikawa, Hyogo (JP); Masaki Kondo, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 0 days.

(21) Appl. No.: 16/988,726

(22) Filed: Aug. 10, 2020

(65) Prior Publication Data

US 2021/0095890 A1 Apr. 1, 2021

(30) Foreign Application Priority Data

Sep. 26, 2019 (JP) .............................. JP2019-175006

(51) Int. Cl.
*F28F 13/00* (2006.01)
*F24H 9/00* (2006.01)
*F24H 1/10* (2006.01)

(52) U.S. Cl.
CPC ........... *F24H 9/0031* (2013.01); *F24H 1/107* (2013.01)

(58) Field of Classification Search
CPC ...... F24H 1/107; F24H 9/0026; F24H 9/0031; F28F 3/02; F28F 13/00
See application file for complete search history.

(56) References Cited

U.S. PATENT DOCUMENTS

| 7,267,163 | B2* | 9/2007 | Osakabe | F28F 3/027 165/153 |
| 2005/0263270 | A1* | 12/2005 | Osakabe | F28F 3/027 165/153 |
| 2020/0096231 | A1* | 3/2020 | Kusakabe | F23J 11/00 |
| 2020/0386441 | A1* | 12/2020 | Jeong | F24H 9/128 |

FOREIGN PATENT DOCUMENTS

| JP | 04073595 A | * | 3/1992 | |
| JP | 2018109485 | | 7/2018 | |
| JP | 2020070938 A | * | 5/2020 | ............ F28F 9/0282 |

* cited by examiner

*Primary Examiner* — Gregory A Wilson
(74) *Attorney, Agent, or Firm* — JCIPRNET (57) ABSTRACT

Provided is a miniaturized water heater having a plate type heat exchanger. The water heater includes a combustion device generating combustion gas by burning fuel; a heat exchange device heating hot water by heat exchange with the combustion gas; and an exhaust part exhausting the combustion gas after heat exchange. The heat exchange device includes a plate laminate in which vertically standing plates are laminated with gaps, and the hot water is heated by alternately flowing the combustion gas and the hot water through the gaps of the plate laminate. The combustion gas flowing in a vertical direction from the combustion device is introduced vertically or substantially vertically into an introduction part provided on a combustion device side of the plate laminate, and a flow direction of the combustion gas in the plate laminate is reversed to discharge the combustion gas to the exhaust part.

3 Claims, 6 Drawing Sheets

FIG. 6 ature decrease of the combustion gas and the con-
WATER HEATER

CROSS-REFERENCE TO RELATED APPLICATION

This application claims the priority benefits of Japanese application no. 2019-175006, filed on Sep. 26, 2019. The entirety of the above-mentioned patent application is hereby incorporated by reference herein and made a part of this specification.

BACKGROUND

Technical Field

The disclosure relates to a water heater including a plate type heat exchanger.

Description of Related Art

Conventionally, a water heater including a plate type heat exchanger has been widely used to heat clean water and supply hot water. The plate type heat exchanger is formed by laminating a plurality of plates with constant gaps, and allows combustion gas and hot water, for example, to alternately flow through the plurality of gaps, so as to exchange heat between the combustion gas and the hot water and heat the hot water.

Such a plate type heat exchanger is used, for example, as a secondary heat exchanger for recovering the latent heat of the combustion gas of the reverse combustion type combustion device of Patent Document 1. The combustion gas is introduced into the plate type heat exchanger from above and discharged below. Then, the flow direction of the combustion gas is reversed by an exhaust collecting cylinder that also serves as a drain pan arranged in the lower portion of the plate type heat exchanger, and the combustion gas is discharged from an upper exhaust part via an exhaust duct.

RELATED ART

Patent Document

[Patent Document 1] Japanese Laid-Open No. 2018-109485

SUMMARY

Problems to be Solved

In the configuration of Patent Document 1, the combustion gas that flows downward in the vertical direction is reversed after passing through the plate type heat exchanger, and the drain and the combustion gas are separated to be discharged respectively. However, since the exhaust collecting cylinder is arranged in the lower portion of the plate type heat exchanger and the exhaust duct is arranged on the lateral side (rear side) of the plate type heat exchanger, the length of the exhaust passage is increased, and the water heater equipped with the reverse combustion type combustion device is large in size.

The disclosure provides a miniaturized water heater having a plate type heat exchanger.

Means for Solving the Problems

A water heater according to an embodiment of the disclosure includes: a combustion device generating combustion gas by burning fuel; a heat exchange device heating hot water by heat exchange with the combustion gas; and an exhaust part exhausting the combustion gas after heat exchange. The heat exchange device includes a plate laminate in which a plurality of plates standing vertically are laminated with gaps, and is configured so that the hot water is heated by alternately flowing the combustion gas and the hot water through the plurality of gaps of the plate laminate. The combustion gas flowing in a vertical direction from the combustion device is introduced vertically or substantially vertically into an introduction part provided on a combustion device side of the plate laminate, and a flow direction of the combustion gas in the plate laminate is reversed to discharge the combustion gas to the exhaust part.

According to the above configuration, since the flow direction of the combustion gas is reversed in the plate laminate to discharge the combustion gas to the exhaust part, the combustion gas and the drain can be separated in the plate laminate and discharged respectively. In addition, since it is not necessary to dispose a member for reversing the flow direction of the combustion gas outside the heat exchange device in order to separate the combustion gas and the drain, and the water heater can be miniaturized.

In the water heater according to an embodiment of the disclosure, the plate laminate includes a regulating part that is formed to extend from the introduction part toward an opposite side to a vertical middle portion of the plate laminate in order to regulate flow of the combustion gas introduced into the introduction part in a horizontal direction. According to the above configuration, the flow distance of the combustion gas in the plate laminate can be increased to sufficiently perform heat exchange with the hot water.

In the water heater according to an embodiment of the disclosure, in the plate laminate, a discharge part that discharges the combustion gas introduced from the introduction part to the exhaust part is formed on the same surface as the introduction part of the plate laminate. According to the above configuration, since the exhaust duct that guides the combustion gas from the heat exchange device to the exhaust part can be formed short and arranged so as not to pass through the lateral side of the plate laminate, the water heater can be miniaturized.

In the water heater according to an embodiment of the disclosure, an area of the introduction part of the plate laminate is formed larger than an area of the discharge part. According to the above configuration, the pressure difference generated between the introduction part and the discharge part due to the volume contraction caused by the temperature decrease of the combustion gas and the condensation of the steam can be reduced to stabilize the flow of the combustion gas, and the exhaust duct that guides the combustion gas from the discharge part to the exhaust part can be miniaturized to miniaturize the water heater.

Effects

According to the water heater of the disclosure, the water heater having the plate type heat exchanger can be miniaturized.

DESCRIPTION OF THE EMBODIMENTS

Hereinafter, forms for embodying the disclosure will be described based on the embodiments.

Embodiment

Figure 1:
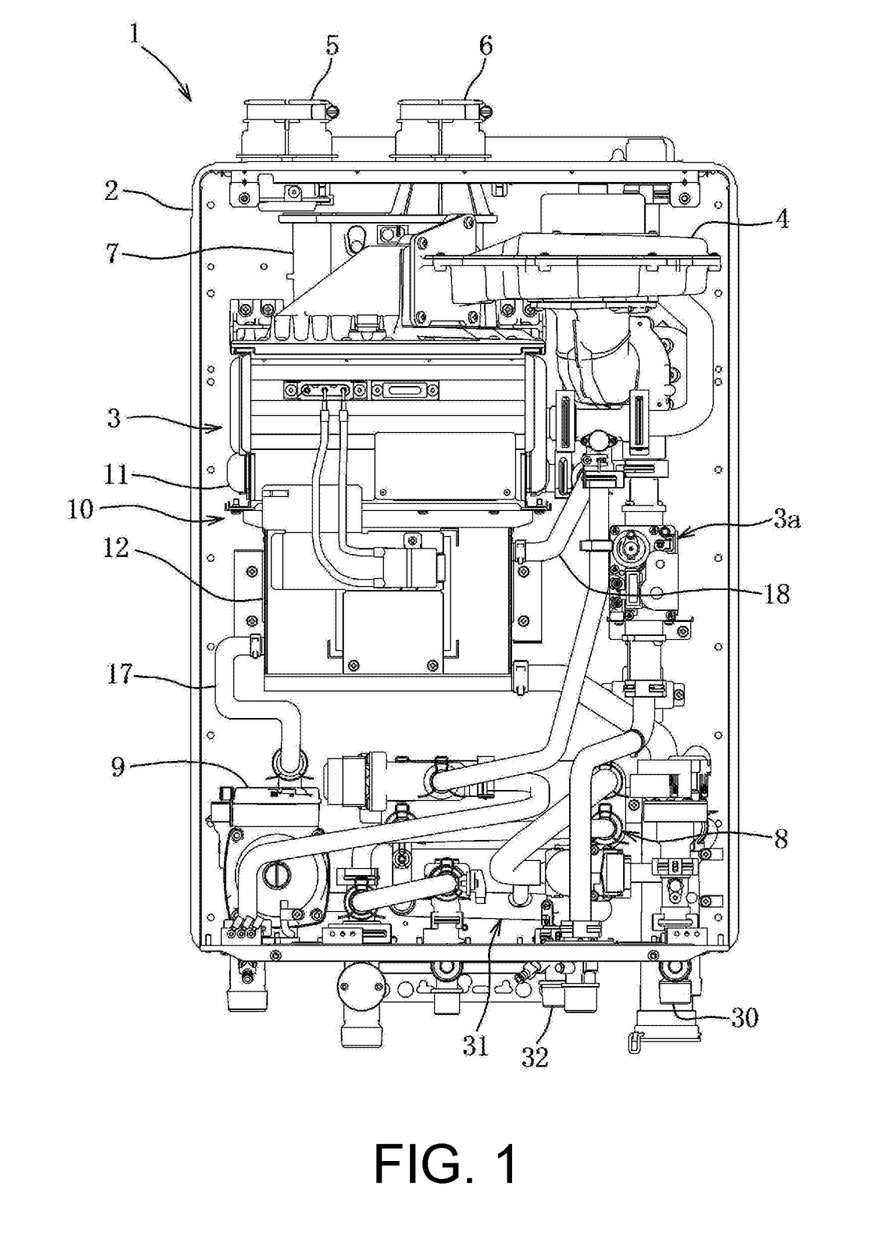
FIG. 1 is a front view of a water heater with a front cover removed according to an embodiment of the disclosure.

First, the overall configuration of a water heater 1 will be described. As shown in FIG. 1, the water heater 1 includes: a combustion part 3 (combustion device) having a burner and a combustion space for burning fuel downward in an exterior case 2 of the water heater 1, a blower fan 4 supplying air for combustion to the combustion part 3, a heat exchange part 10 (heat exchange device) arranged below the combustion part 3, and an exhaust duct 7 guiding the combustion gas from the heat exchange part 10 to an exhaust part 6 above. A pump 9 or the like for circulating hot water (heat medium) between the heat exchange part 10 and a hot water supply heat exchanger 8 is also provided. The exterior case 2 is a box formed of a thin metal plate and having an open front surface, and a front panel (not shown) covering the front surface can be attached and detached.

The blower fan 4 supplies the air supplied into the exterior case 2 from an air supply part 5 on the upper surface of the exterior case 2 to the combustion part 3. The combustion part 3 uses the air supplied from the blower fan 4 to burn fuel (for example, natural gas, petroleum, etc.) supplied from a fuel supply part 3a downward and generate combustion gas. The combustion gas flows downward together with the air supplied from the blower fan 4, and is supplied to the heat exchange part 10.

The heat exchange part 10 heats the hot water supplied from the pump 9 by heat exchange with the combustion gas supplied from the combustion part 3. The heated hot water is supplied to the hot water supply heat exchanger 8. The hot water supply heat exchanger 8 heats the clean water supplied from a water supply part 30 by heat exchange with the hot water supplied from the heat exchange part 10. The hot water heated by the hot water supply heat exchanger 8 is mixed with clean water by a mixing device 31 to adjust the temperature, and is supplied from a hot water supply part 32 to a hot water tap or the like (not shown). The hot water heated by the heat exchange part 10 is also used for heating.

The heat exchange part 10 has, for example, a fin and tube type primary heat exchanger 11 that recovers sensible heat of the combustion gas to heat the hot water, and a plate type secondary heat exchanger 12 that recovers latent heat of the combustion gas to heat the hot water. The combustion gas supplied from the combustion part 3 heats the hot water with the primary heat exchanger 11 and the temperature is lowered. The combustion gas having the lowered temperature heats the hot water with the secondary heat exchanger 12, and is lowered to a temperature at which the steam contained in the combustion gas is condensed. The hot water is heated to some extent by the secondary heat exchanger 12, and then further heated to a higher temperature by the primary heat exchanger 11 and supplied to the hot water supply heat exchanger 8.

The secondary heat exchanger 12 of the heat exchange part 10 is equipped with the exhaust duct 7. The exhaust duct 7 guides the combustion gas discharged from the secondary heat exchanger 12 to the exhaust part 6 on the upper portion of the exterior case 2. Then, the combustion gas is exhausted from the exhaust part 6 to the outside of the water heater 1.

Figure 2:
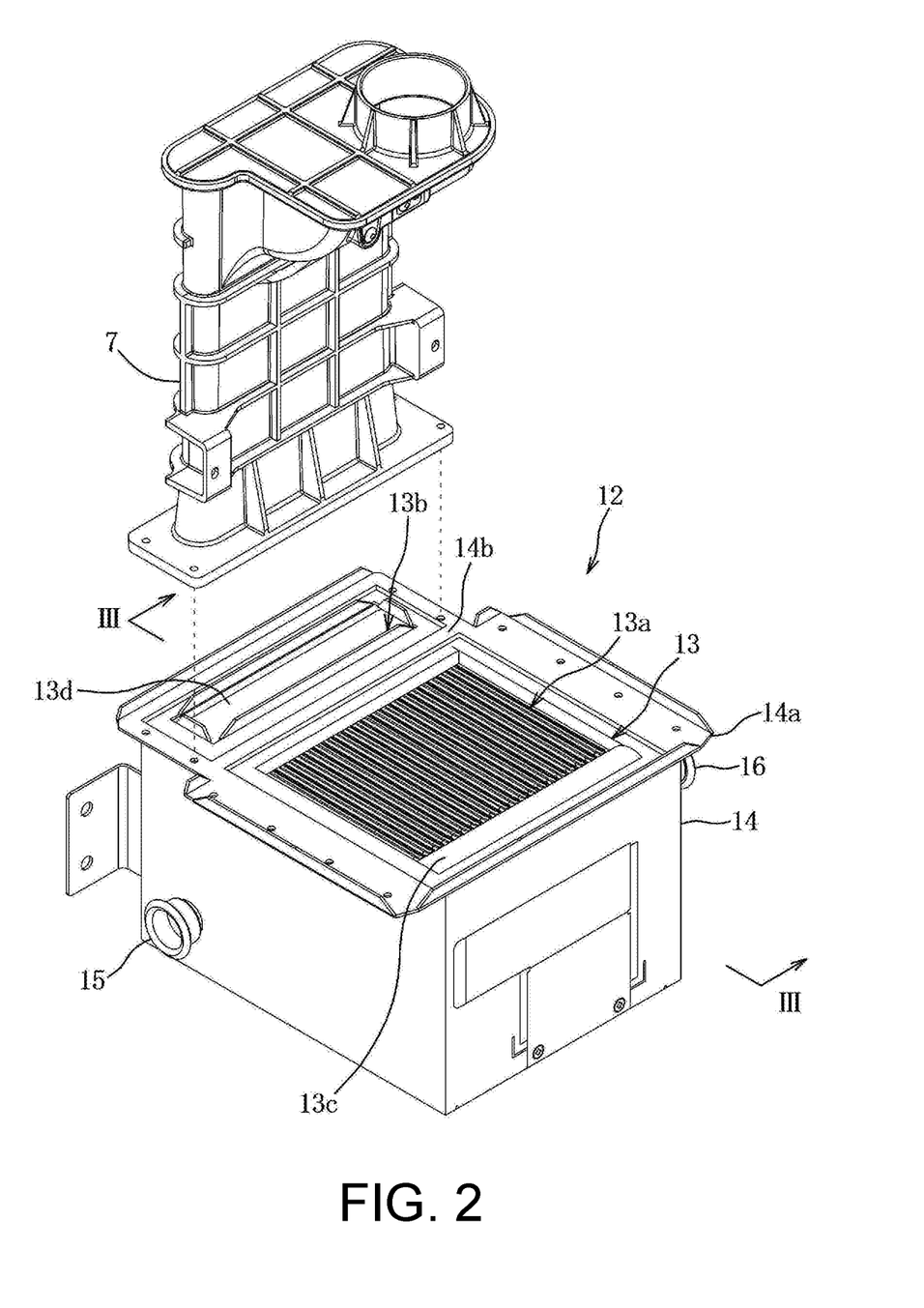
FIG. 2 is an exploded perspective view of main parts of a secondary heat exchanger and an exhaust duct according to an embodiment.

Next, the secondary heat exchanger 12 will be described. As shown in FIG. 2, the secondary heat exchanger 12 has a plate laminate 13 formed by laminating a plurality of (for example, 50) plates made of stainless steel, for example, and a secondary heat exchange case 14 accommodating the plate laminate 13. The plate laminate 13 is formed by laminating a plurality of plates that stand vertically in the horizontal direction, and is accommodated in the secondary heat exchange case 14. The plurality of plates are laminated so as to keep a gap between the adjacent plates, and the hot water is heated by alternately flowing the combustion gas and the hot water through the plurality of gaps of the plate laminate 13.

In order to supply the hot water to the plate laminate 13, a hot water inlet 15 is provided in a protruding shape at the lower portion of one side surface of the secondary heat exchange case 14. Further, in order to supply the heated hot water to the primary heat exchanger 11, a hot water outlet 16 is provided in a protruding shape at the upper portion of the side surface of the secondary heat exchange case 14 on the side opposite to the hot water inlet 15. Then, the pump 9 and the hot water inlet 15 are connected by a piping member 17, and the hot water outlet 16 and the hot water inlet of the primary heat exchanger 11 are connected by a piping member 18 (see FIG. 1).

Figure 3:
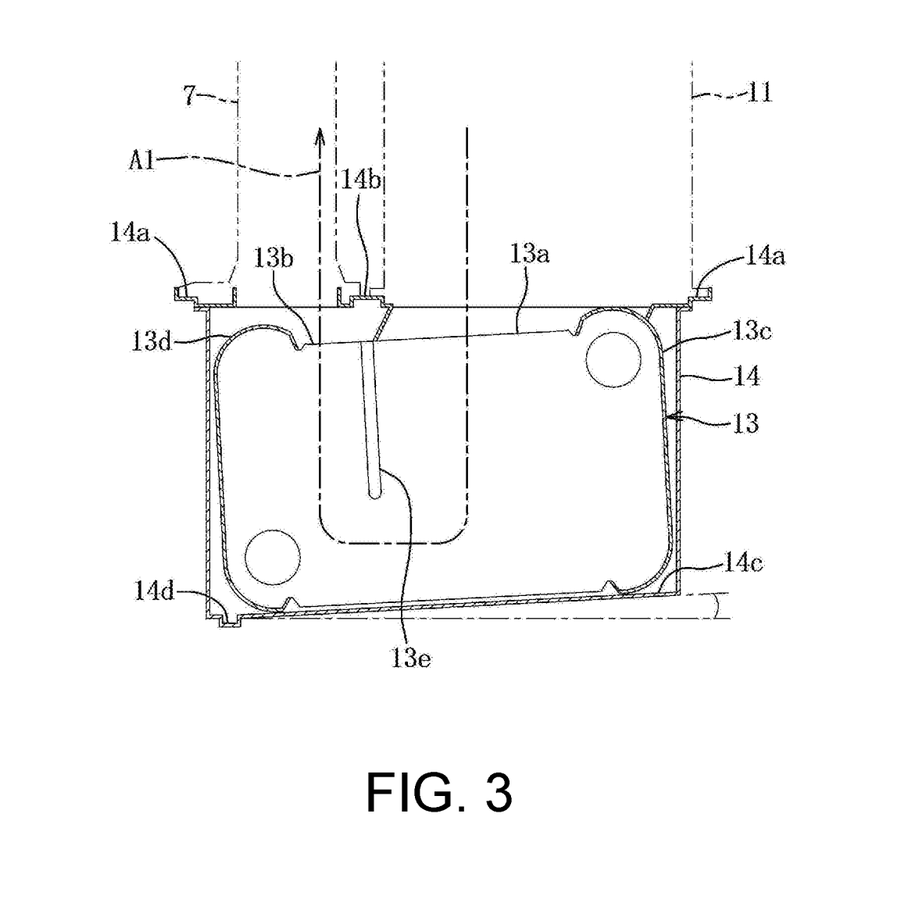
FIG. 3 is a cross-sectional view taken along the line III-III of the secondary heat exchanger of FIG. 2.

As shown in FIG. 2 and FIG. 3, the secondary heat exchange case 14 is a box having an open upper surface. The upper end of the secondary heat exchange case 14 is provided with a flange part 14a for connecting to the primary heat exchanger 11 and the exhaust duct 7, and a partition part 14b that partitions between the primary heat exchanger 11 and the exhaust duct 7. An opening on the side of the primary heat exchanger 11, which is partitioned by the partition part 14b, communicates with an introduction part 13a that introduces the combustion gas of the plate laminate 13, and an opening on the side of the exhaust duct 7 communicates with a discharge part 13b of the plate laminate 13. Although not shown, a gasket for preventing leakage of the combustion gas is provided at the connecting portions between the primary heat exchanger 11 and the exhaust duct 7 and the secondary heat exchange case 14.

The area of the introduction part 13a is formed larger than the area of the discharge part 13b, and correspondingly, the opening area of the opening communicating with the introduction part 13a is formed larger than the opening area of the opening communicating with the discharge part 13b. Thereby, the pressure difference generated between the introduction part 13a and the discharge part 13b due to the volume contraction caused by the temperature decrease and the condensation of the steam can be reduced to stabilize the flow of the combustion gas, and the horizontal cross-section of the exhaust duct 7 can be reduced to miniaturize the exhaust duct 7.

In addition, the introduction part 13a and the discharge part 13b of the plate laminate 13 are formed side by side on the same surface (upper surface). Therefore, the exhaust duct 7 can be formed to be short so as not to pass through the lateral side of the plate laminate 13.

The secondary heat exchange case 14 gently inclines a bottom 14c so that the side of the discharge part 13b is low when the flange part 14a is set horizontally. The drain generated by condensing the steam in the combustion gas flows down through the inclined bottom 14c and is collected in a groove 14d, and is drained from the groove 14d to the outside of the secondary heat exchange case 14, neutralized, and then drained. In order not to interfere with the downward flow of the drain, the plate laminate 13, which is in contact with the bottom 14c of the secondary heat exchange case 14, is accommodated in the secondary heat exchange case 14 so that all the vertically standing plates are parallel to the inclination direction.

Cover members 13c and 13d are provided on the two side surfaces facing the plurality of gaps of the plate laminate 13 and the corners respectively connected in a curved surface shape to the upper surface and the lower surface from these side surfaces, so as to prevent the combustion gas from releasing to the outside of the plate laminate 13. The arrow A1 indicates an example of the flow of the combustion gas. The combustion gas is introduced vertically or substantially vertically into the introduction part 13a of the plate laminate 13 from the side of the primary heat exchanger 11 above. Since a flowable range of the introduced combustion gas is regulated by the plates, the cover members 13c and 13d, and the bottom 14c of the secondary heat exchange case 14, the flow direction is reversed in the plate laminate 13, and the introduced combustion gas is discharged from the discharge part 13b.

A peripheral portion of the opening communicating with the introduction part 13a is bent downward so as to contact the upper end of the plate laminate 13 in order to close the gap between the opening and the upper end of the plate laminate 13. A member for closing the gap may be provided. Thereby, the combustion gas that flows between the plate laminate 13 and the secondary heat exchange case 14 and does not contribute to heat exchange is reduced.

The plate laminate 13 has a regulating part 13e corresponding to the introduction part 13a and the discharge part 13b. The regulating part 13e is formed to extend from the side of the introduction part 13a (upper surface side) toward the opposite side to a vertical middle portion of the plate laminate 13. Then, the combustion gas introduced into the introduction part 13a is regulated by the regulating part 13e so as not to flow toward the side of the discharge part 13b in the horizontal direction. Therefore, in order to flow in the horizontal direction through the lower side portion of the plate laminate 13 where horizontal flow is not regulated, the combustion gas flows in the vertical direction, so the flow distance increases and the chances of heat exchange increase.

Figure 4:
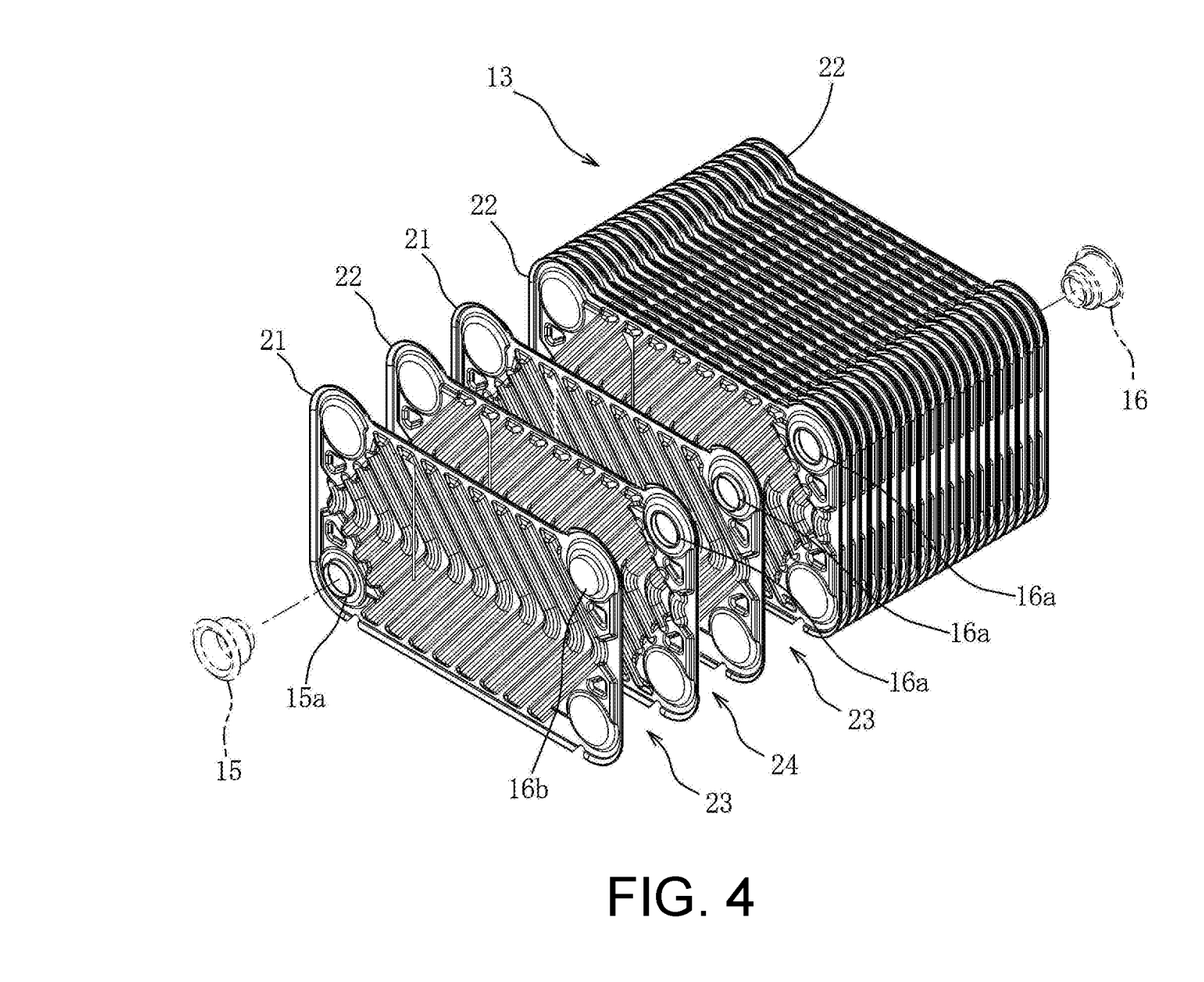
FIG. 4 is an exploded perspective view of main parts of a plate laminate according to an embodiment.
Figure 5:
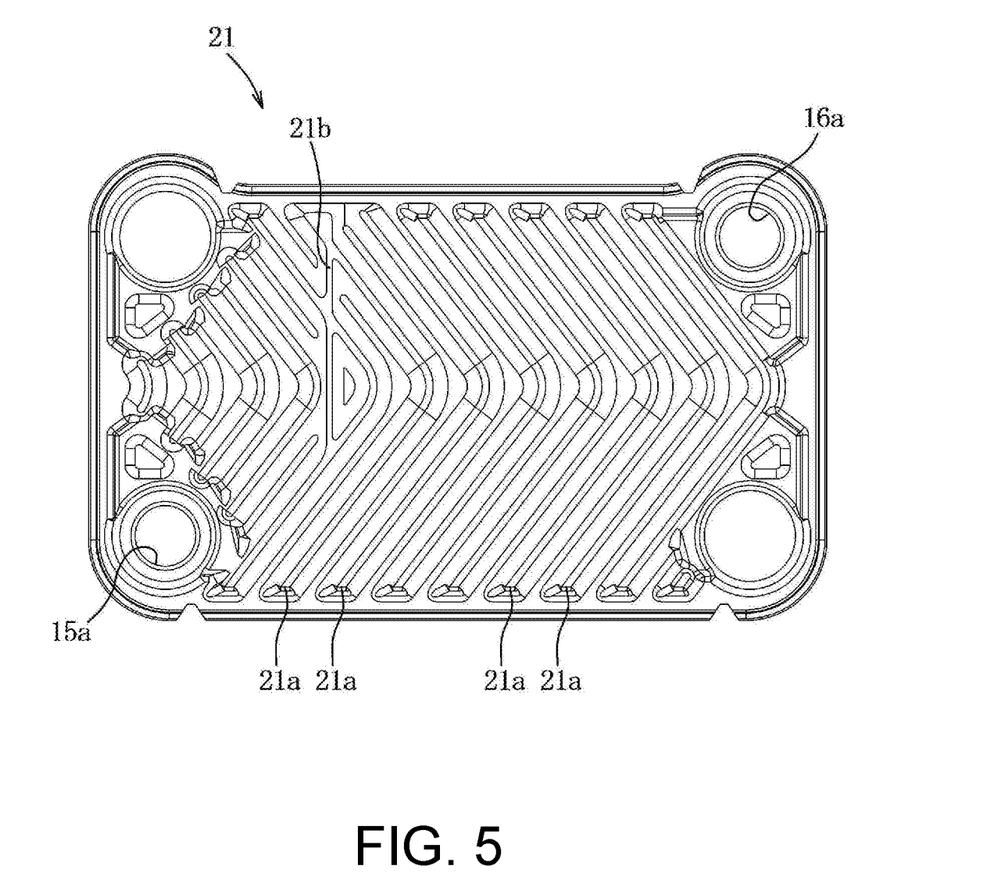
FIG. 5 is a side view of a first plate of the plate laminate of FIG. 4 as viewed from the side of a hot water inlet.
Figure 6:
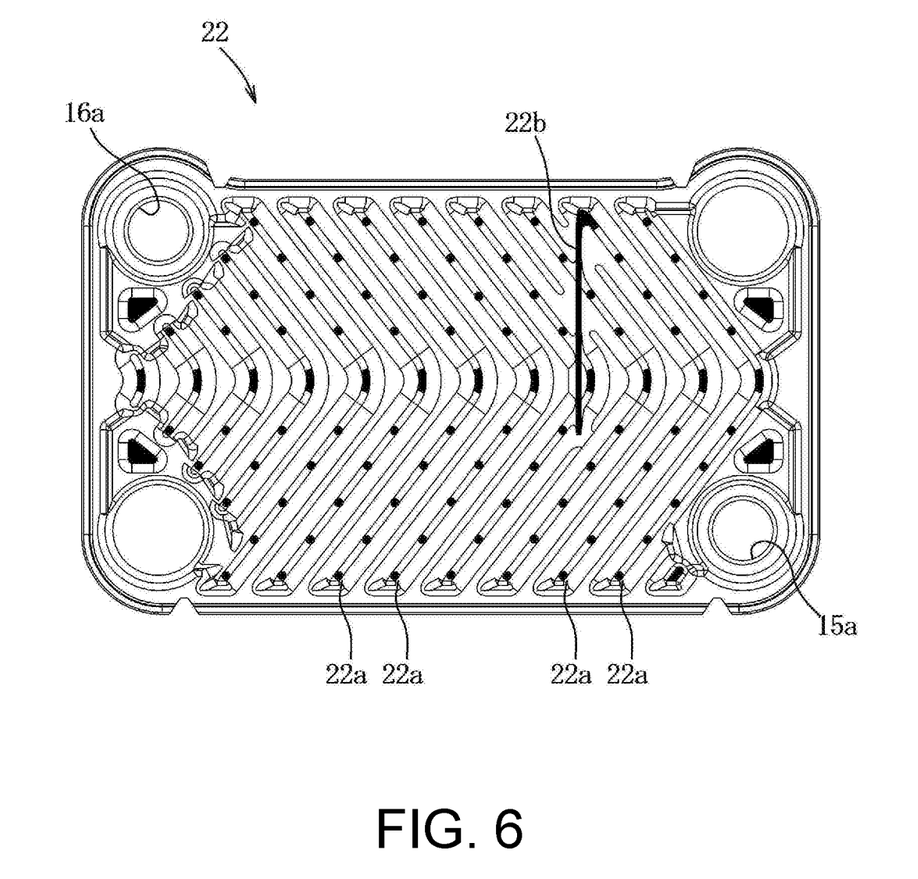
FIG. 6 is a side view of a second plate of the plate laminate of FIG. 4 as viewed from the side of a hot water outlet.

Next, the plate laminate 13 will be described. As shown in FIG. 4 to FIG. 6, the plate laminate 13 is formed by alternately laminating two types of plates, first plates 21 and second plates 22. The first plate 21 has a plurality of ridges 21a that are bulged toward the side of the hot water inlet 15, and the second plate 22 has a plurality of ridges 22a that are bulged toward the side opposite to the hot water inlet 15 (the side of the hot water outlet 16). The ridges 22a of the second plate 22 are formed to reverse the first plate 21 (turn over).

When the first plates 21 and the second plates 22 are laminated in this order from the side of the hot water inlet 15, the gaps between the first plates 21 and the second plates 22 become hot water gaps 23 through which hot water flows. Hot water is supplied to each of the plurality of hot water gaps 23 from a passage part 15a in which the hot water introduced from the hot water inlet 15 flows. The outer edges of the first and second plates 21 and 22 are superposed in close contact with each other so that the hot water does not release to the outside. The hot water that is supplied from the passage part 15a and flows through the hot water gap 23 is discharged from the hot water outlet 16 through a passage part 16a. In addition, the passage part 16a of the outermost first plate 21 of the plate laminate 13 is closed by, for example, a cap 16b. Similarly, the passage part 15a of the outermost second plate 22 of the plate laminate 13 on the opposite side is also closed.

On the other hand, when the second plates 22 and the first plates 21 are laminated in this order from the side of the hot water inlet 15, the gaps between the second plates 22 and the first plates 21 become gas gaps 24 through which the combustion gas flows. In the plurality of gas gaps 24, the plurality of ridges 21a and 22a of the first and second plates 21 and 22 are brought into contact with each other respectively, and the combustion gas can enter and exit by separating the outer edges of the first and second plates 21 and 22 from each other. In these gas gaps 24, the passage parts 15a and 16a are superposed in close contact with each other so that the hot water does not release to the outside, and the hot water does not flow into the gas gaps 24.

The regulating part 13e is formed by regulating ridges 21b and 22b which are formed by bulging predetermined portions of the first and second plates 21 and 22 together with the ridges 21a and 22a. Then, in the plurality of gas gaps 24, the regulating ridges 21b and 22b of the first and second plates 21 and 22 are brought into contact with each other respectively. With these regulating ridges 21b and 22b, the flow of the combustion gas in the horizontal direction toward the side of the discharge part 13b is regulated from the introduction part 13a to the vertical middle portion of the plate laminate 13. The colored portions of FIG. 6 indicate the portions of the second plate 22 that come into contact with the ridges 21a and the regulating ridges 21b of the first plate 21. These contact portions are brazed at the time of forming the plate laminate 13.

In such a plate laminate 13, the hot water gaps 23 are adjacent to the gas gaps 24 via the first and second plates 21 and 22. Therefore, the hot water is heated from both sides. Further, the surface areas of the plates are enlarged by the ridges 21a and 22a, and the combustion gas and the hot water respectively form minute vortexes, and flow while being agitated. Therefore, heat exchange is efficiently performed between the combustion gas and the hot water.

The operation and effect of the water heater 1 of the above embodiment will be described. The water heater 1 includes the combustion part 3 that burns fuel to generate the combustion gas, the heat exchange part 10 that heats hot water by heat exchange with the combustion gas, and the exhaust part 6 for exhausting the combustion gas after heat exchange. The heat exchange part 10 includes the plate laminate 13 in which a plurality of vertically standing plates are laminated with gaps therebetween, and the heat exchange part 10 is configured so that hot water is heated by alternately flowing the combustion gas and the hot water through the plurality of gaps of the plate laminate 13. The combustion gas flowing in the vertical direction from the combustion part 3 is introduced vertically or substantially vertically into the introduction part 13a provided on the side of the combustion part 3 of the plate laminate 13, and the flow direction is reversed in the plate laminate 13, and the combustion gas is discharged to the exhaust part 6.

Since the flow direction of the combustion gas is reversed in the plate laminate 13 to discharge the combustion gas to the exhaust part 6, the combustion gas and the drain can be separated in the plate laminate 13 and discharged respectively. In addition, it is not necessary to dispose a member for reversing the flow direction of the combustion gas after heat exchange outside the heat exchange part 10 in order to separate the combustion gas and the drain, and the water heater 1 can be miniaturized.

The plate laminate 13 has the regulating part 13e that is formed to extend from the introduction part 13a toward the opposite side to the vertical middle portion of the plate laminate 13, in order to regulate the flow of the combustion gas introduced into the introduction part 13a in the horizontal direction. Accordingly, the flow distance of the combustion gas in the plate laminate 13 can be increased to sufficiently perform heat exchange with the hot water.

In the plate laminate 13, the discharge part 13b that discharges the combustion gas introduced from the introduction part 13a to the exhaust part 6 is arranged side by side and formed on the same surface (upper surface) with the introduction part 13a of the plate laminate 13. Since the exhaust duct 7 that guides the combustion gas from the heat exchange part 10 to the exhaust part 6 can be formed short and arranged so as not to pass through the lateral side of the plate laminate 13, the water heater 1 can be miniaturized.

The area of the introduction part 13a of the plate laminate 13 is formed to be larger than the area of the discharge part 13b. Accordingly, the horizontal cross-section of the exhaust dust 7 that guides the combustion gas from the discharge part 13b to the exhaust part 6 can be reduced to miniaturize the exhaust dust 7, and the water heater 1 can be miniaturized.

An example in which the above embodiment is partially modified will be described.

[1] The heat exchange part 10 of the water heater may be configured by all plate type heat exchangers. For example, by configuring the primary heat exchanger and the secondary heat exchanger with common members, it is possible to miniaturize the water heater as well as reduce the manufacturing cost.

[2] The water heater may be configured to have an upper combustion type combustion part, a heat exchange part, and an exhaust part in this order from the bottom. In this case, the combustion gas flowing in the primary heat exchanger is introduced from above a plate type heat exchanger, which is the secondary heat exchanger, and the flow direction is reversed in the plate laminate so that the combustion gas is exhausted from the exhaust part above. A duct for introducing the combustion gas from above the plate type heat exchanger is required, but the exhaust collecting cylinder and exhaust duct can be omitted to achieve miniaturization.

In addition, those skilled in the art can make various modifications to the above embodiment without departing from the spirit of the disclosure, and the disclosure includes such modifications.

What is claimed is:

1. A water heater, comprising:
   a combustion device generating combustion gas by burning fuel;
   a heat exchange device heating hot water by heat exchange with the combustion gas; and
   an exhaust part exhausting the combustion gas after heat exchange,
   wherein the heat exchange device comprises a plate laminate in which a plurality of plates standing vertically are laminated with gaps, and is configured so that the hot water is heated by alternately flowing the combustion gas and the hot water through the plurality of gaps of the plate laminate, and
   the combustion gas flowing in a vertical direction from the combustion device is introduced vertically or substantially vertically into an introduction part provided on a combustion device side of the plate laminate, and a flow direction of the combustion gas in the plate laminate is reversed to discharge the combustion gas to the exhaust part,
   wherein the plate laminate comprises a regulating part that is formed to extend from the introduction part toward an opposite side to a vertical middle portion of the plate laminate in order to regulate flow of the combustion gas introduced into the introduction part in a horizontal direction.

2. The water heater according to claim 1, wherein in the plate laminate, a discharge part that discharges the combustion gas introduced from the introduction part to the exhaust part is formed on a same surface as the introduction part of the plate laminate.

3. The water heater according to claim 2, wherein an area of the introduction part of the plate laminate is formed larger than an area of the discharge part.

* * * * *